US010907501B2

(12) United States Patent
Filippi et al.

(10) Patent No.: US 10,907,501 B2
(45) Date of Patent: Feb. 2, 2021

(54) SHROUD HANGER ASSEMBLY COOLING

(71) Applicant: General Electric Company, Schenectady, NY (US)

(72) Inventors: Sergio Filippi, Montgomery, OH (US); Ryan Nicholas Porter, Jamestown, OH (US); Craig Alan Gonyou, Blanchester, OH (US); Scott Alan Schimmels, Miamisburg, OH (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 16/106,641

(22) Filed: Aug. 21, 2018

(65) Prior Publication Data

US 2020/0063601 A1 Feb. 27, 2020

(51) Int. Cl.
| | | |
|---|---|---|
| *F01D 25/12* | (2006.01) | |
| *F01D 25/24* | (2006.01) | |
| *F01D 11/08* | (2006.01) | |
| *F01D 25/00* | (2006.01) | |

(52) U.S. Cl.
CPC ............ *F01D 25/12* (2013.01); *F01D 11/08* (2013.01); *F01D 25/005* (2013.01); *F01D 25/246* (2013.01); *F05D 2220/32* (2013.01); *F05D 2240/12* (2013.01); *F05D 2240/91* (2013.01); *F05D 2260/201* (2013.01); *F05D 2300/2112* (2013.01); *F05D 2300/2261* (2013.01); *F05D 2300/6033* (2013.01)

(58) Field of Classification Search
CPC . F01D 5/12; F01D 5/005; F01D 5/246; F01D 11/08; F05D 2220/32; F05D 2240/12; F05D 2240/91; F05D 2260/201; F05D 2300/2112; F05D 2300/2261; F05D 2300/6033
See application file for complete search history.

(56) References Cited

U.S. PATENT DOCUMENTS

| | | | | |
|---|---|---|---|---|
| 1,734,216 | A | * 11/1929 | Lamb | ...................... F01D 25/08 415/1 |
| 5,167,487 | A | * 12/1992 | Rock | ....................... F01D 11/18 415/173.1 |
| 5,584,651 | A | 12/1996 | Pietraszkiewicz et al. | |
| 5,609,466 | A | 3/1997 | North et al. | |
| 6,139,257 | A | * 10/2000 | Proctor | ..................... F01D 9/04 415/115 |

(Continued)

*Primary Examiner* — Moshe Wilensky
*Assistant Examiner* — Joshua R Beebe
(74) *Attorney, Agent, or Firm* — Dority & Manning. P. A.

(57) ABSTRACT

Shroud assemblies and methods for cooling gas turbine engine shrouds are provided. For example, a shroud assembly comprises a shroud segment having hot and cold side portions. The hot side portion faces a gas flow path, and the cold side portion faces a cooling fluid flow path. The shroud assembly further comprises a shroud hanger for mounting the shroud segment in the gas turbine engine. The shroud hanger includes a conduit for receipt of a flow of cooling fluid that defines an outlet configured for the flow of cooling fluid to exit the conduit substantially tangential to the cold side portion of the shroud segment. The shroud and shroud hanger together define an annular cavity that forms the cooling fluid flow path, and fluid exits a plurality of conduits defined in the shroud hanger into the cavity substantially tangential to the shroud cold side to cool the shroud cold side.

13 Claims, 5 Drawing Sheets

(56) References Cited

U.S. PATENT DOCUMENTS

| | | | |
|---|---|---|---|
| 6,354,795 B1 | 3/2002 | White et al. | |
| 6,942,445 B2 | 9/2005 | Morris et al. | |
| 7,273,345 B2 * | 9/2007 | Birrell | F01D 25/14 415/1 |
| 7,682,130 B2 * | 3/2010 | Jurjevic | F01D 25/12 415/108 |
| 7,766,610 B2 * | 8/2010 | Busekros | F01D 25/12 415/108 |
| 8,104,292 B2 | 1/2012 | Lee et al. | |
| 8,550,774 B2 * | 10/2013 | Maltson | F01D 5/225 415/116 |
| 8,714,918 B2 | 5/2014 | Tibbott et al. | |
| 9,915,176 B2 | 3/2018 | Murray et al. | |
| 10,094,285 B2 * | 10/2018 | Munshi | F02C 7/12 |
| 2003/0082046 A1 * | 5/2003 | Nigmatulin | F01D 11/08 415/1 |
| 2006/0073010 A1 * | 4/2006 | Busekros | F01D 25/12 415/177 |
| 2006/0191274 A1 * | 8/2006 | Jurjevic | F01D 25/12 62/186 |
| 2007/0065274 A1 * | 3/2007 | Birrell | F01D 25/14 415/116 |
| 2010/0189542 A1 * | 7/2010 | Maltson | F01D 5/225 415/1 |
| 2012/0027572 A1 * | 2/2012 | Denece | F01D 9/04 415/127 |
| 2014/0286763 A1 * | 9/2014 | Munshi | F02C 7/12 415/178 |
| 2017/0342849 A1 | 11/2017 | Rice et al. | |

* cited by examiner

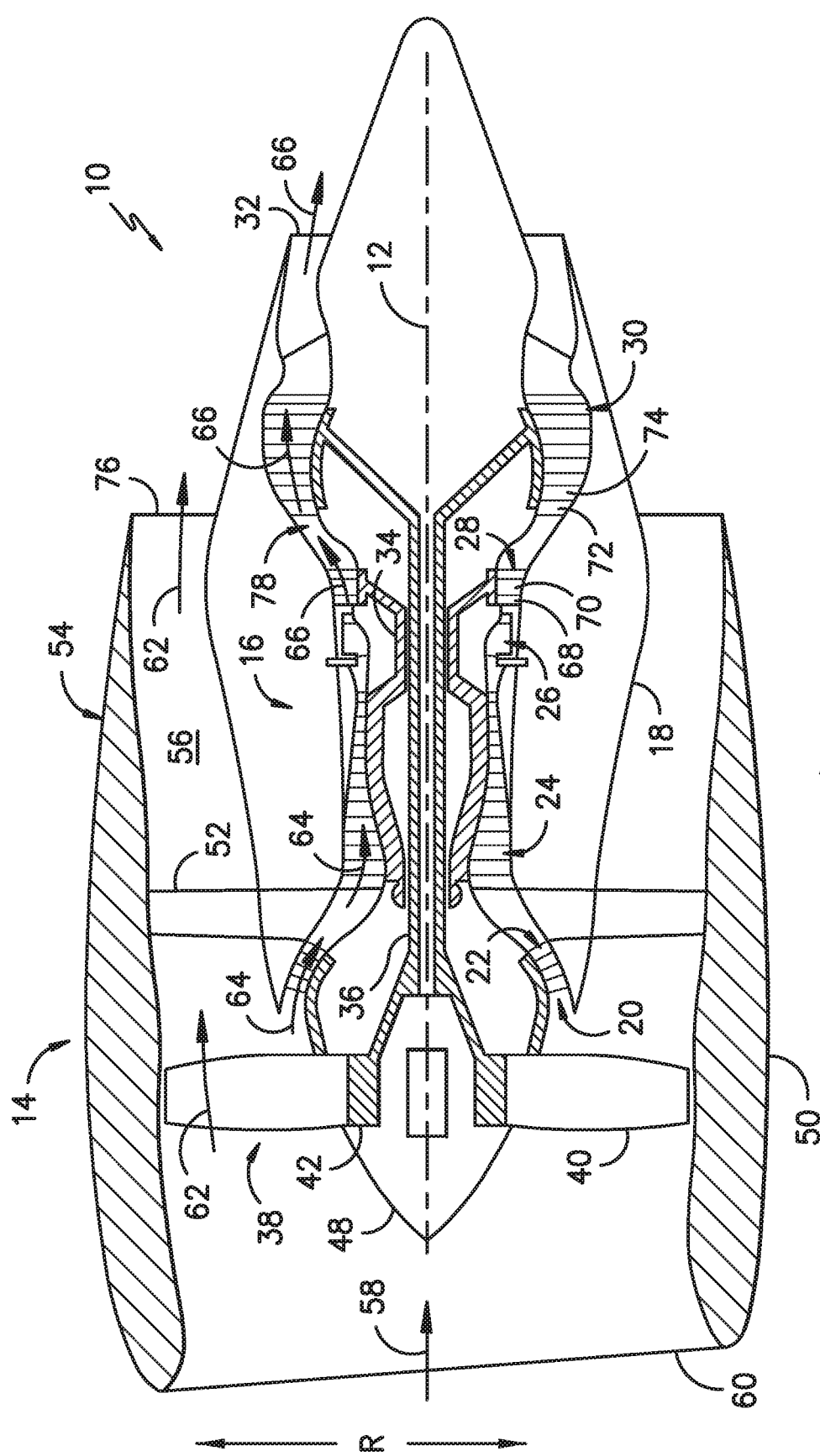
FIG. -1-

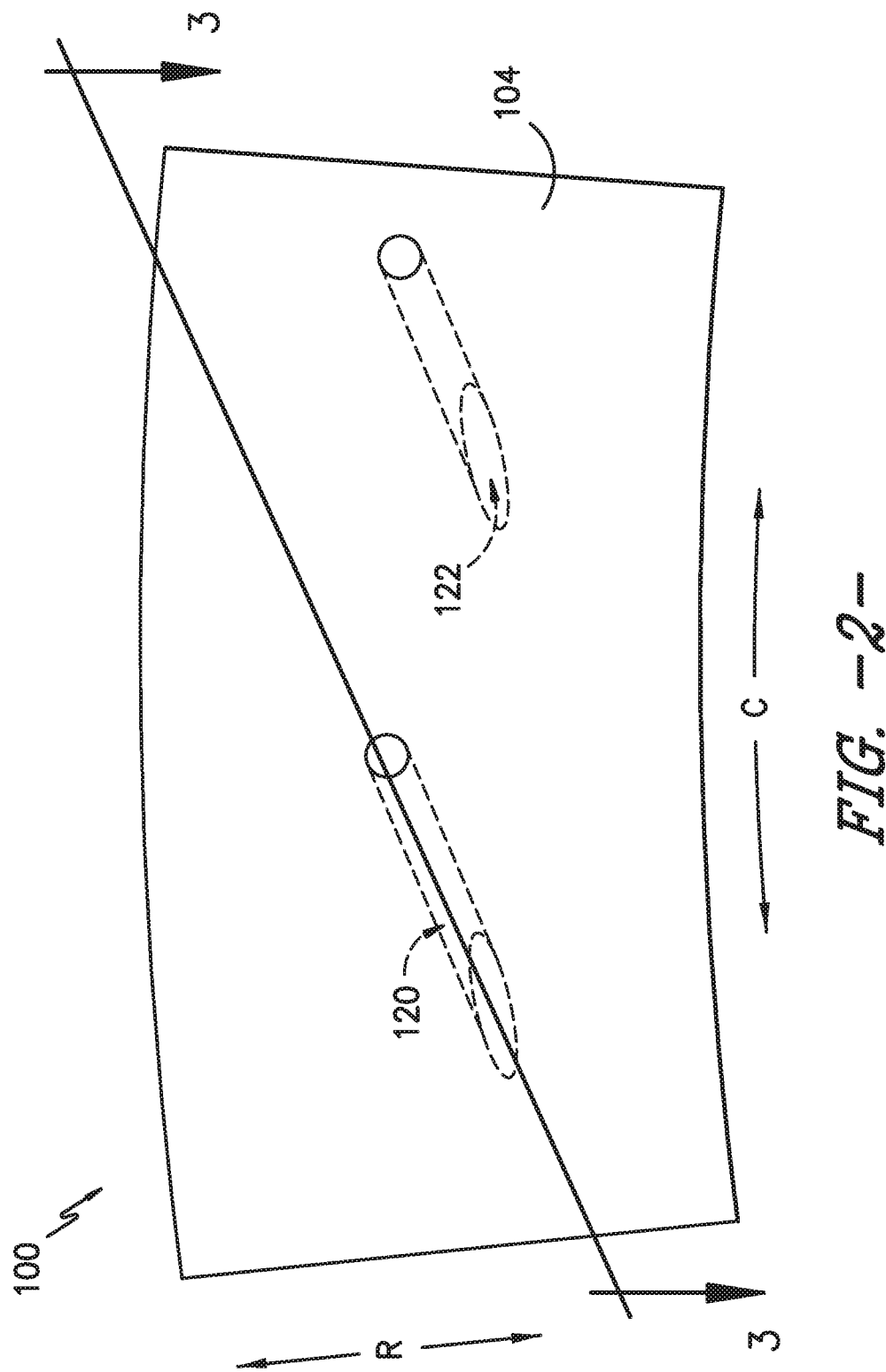
FIG. -2-

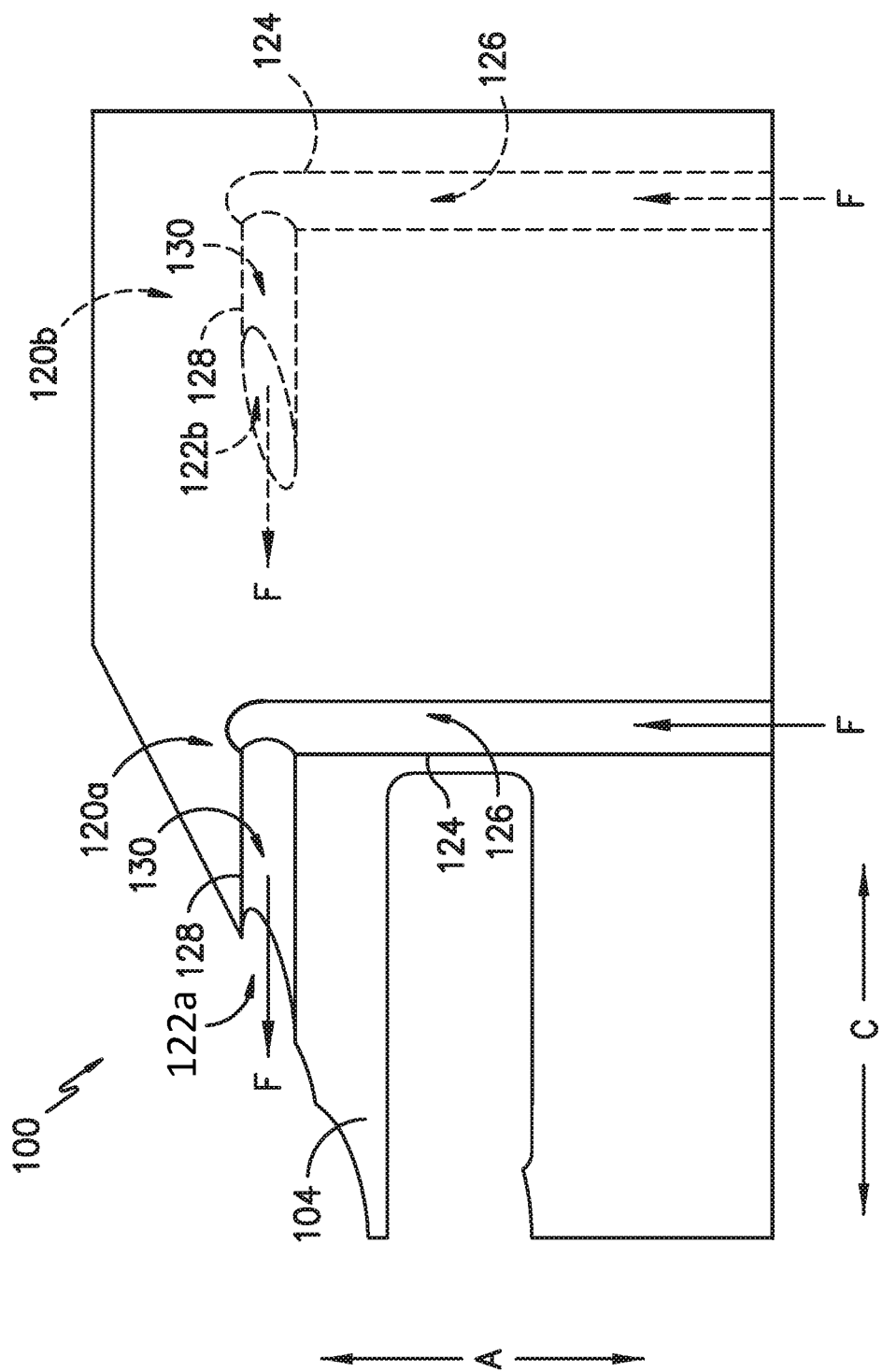
FIG. -3-

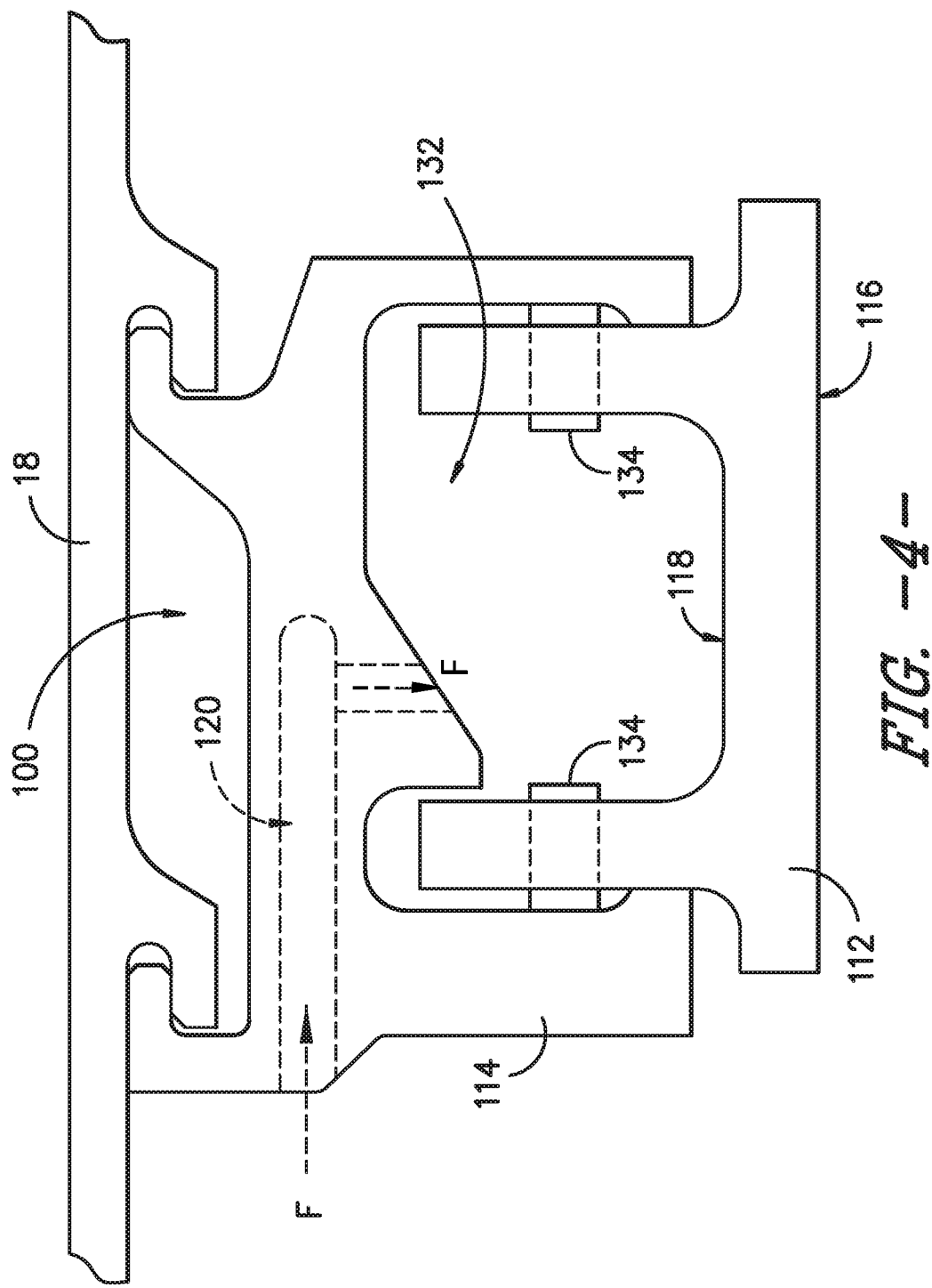
FIG. -4-

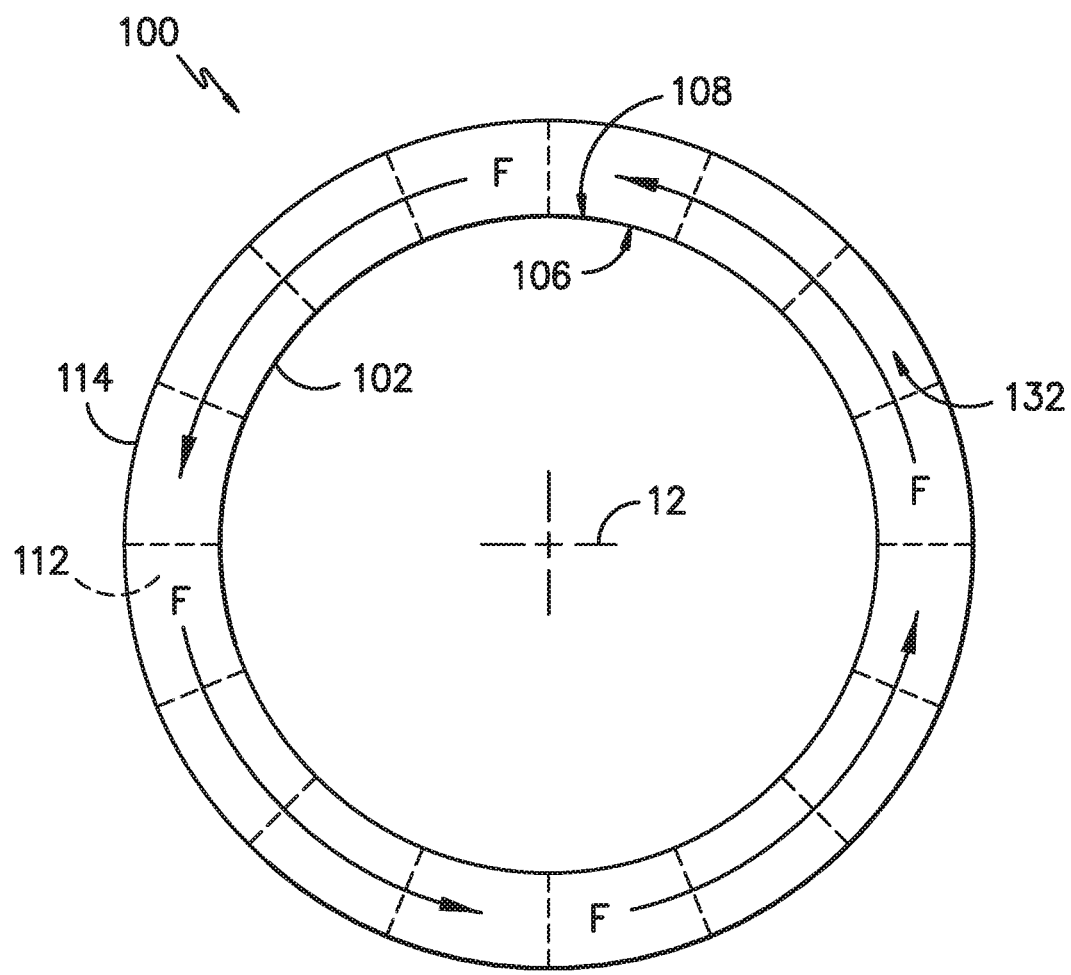
FIG. -5-

SHROUD HANGER ASSEMBLY COOLING

FEDERALLY SPONSORED RESEARCH

This invention was made with government support under contact number FA826-16-C-2138 of the United States Department of Defense. The government may have certain rights in the invention.

FIELD

The present subject matter relates generally to gas turbine engines. More particularly, the present subject matter relates to cooling configurations for turbine shrouds and shroud hangers.

BACKGROUND

Generally, a gas turbine engine core includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases, exposing components within the combustion section to relatively high temperatures. The combustion gases are routed from the combustion section to the turbine section. The flow of combustion gases through the turbine section drives the turbine section and is then routed through the exhaust section, e.g., to atmosphere.

More particularly, the gas turbine engine defines a flow path for routing the combustion gases through the engine. In part, the flow path is defined by a plurality of shrouds positioned radially outward from a stage of turbine rotor blades. Because the shrouds line the combustion gas flow path, the shrouds experience relatively high temperatures of the combustion gases. As such, non-traditional high temperature composite materials, such as ceramic matrix composite (CMC) materials, may be used to form the shrouds. Components fabricated from CMC materials have a higher temperature capability compared with typical components, e.g., metal components, which may allow improved component performance and/or increased engine temperatures. However, even when using high temperature materials, additional benefits could be realized from cooling the shrouds and the shroud hangers to which the shrouds are mounted.

Accordingly, improved turbine shrouds and/or shroud hangers would be desirable. In particular, turbine shroud hangers having a plurality of cooling holes therein that tangentially feed air into a cavity formed by a shroud hanger and a turbine shroud would be useful. Further, a shroud hanger cooling hole configuration that induces a swirling flow of cooling fluid around an annulus formed by a shroud and hanger assembly would be beneficial. Moreover, such a shroud and hanger assembly in which the shroud is formed from a composite material, such as a CMC material, would be advantageous.

BRIEF DESCRIPTION

Aspects and advantages of the invention will be set forth in part in the following description, or may be obvious from the description, or may be learned through practice of the invention.

In one exemplary embodiment of the present subject matter, a shroud assembly for a gas turbine engine is provided. The shroud assembly comprises a shroud segment having a hot side portion and a cold side portion. The hot side portion faces a gas flow path of the gas turbine engine, and the cold side portion faces a cooling fluid flow path. The shroud assembly further comprises a shroud hanger for mounting the shroud segment in the gas turbine engine. The shroud hanger includes a conduit for receipt of a flow of cooling fluid. The conduit defines an outlet, and the outlet is configured for the flow of cooling fluid to exit the conduit substantially tangential to the cold side portion of the shroud segment.

In another exemplary embodiment of the present subject matter, a shroud assembly for a gas turbine engine is provided. The shroud assembly comprises a plurality of shroud segments. Each shroud segment has a hot side portion and a cold side portion. The hot side portion faces a gas flow path of the gas turbine engine. The shroud assembly also comprises a shroud hanger for mounting the shroud segments in the gas turbine engine. The shroud hanger includes a plurality of conduits for receipt of a flow of cooling fluid, and each conduit defines an outlet. The shroud segments and the shroud hanger together define an annular cavity. The cold side portion of each shroud segment faces the cavity. Further, each outlet of the plurality of outlets is configured for the flow of cooling fluid to exit each conduit into the cavity substantially tangential to the cold side of a shroud segment adjacent the outlet.

In a further exemplary embodiment of the present subject matter, a method of cooling a shroud of a gas turbine engine is provided. The method comprises providing a plurality of shroud segments and providing a shroud hanger for mounting the shroud segments in the gas turbine engine. Each shroud segment has a hot side portion and a cold side portion, and the hot side portion faces a gas flow path of the gas turbine engine. The shroud segments and the shroud hanger together define an annular cavity, and the shroud hanger includes a plurality of conduits for receipt of a flow of cooling fluid. The method further comprises directing the flow of cooling fluid into the cavity such that the cooling fluid flows circumferentially about the cavity to cool the cold side portion of each shroud segment of the plurality of shroud segments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a front or forward looking aft view of a segment of a shroud assembly according to an exemplary embodiment of the present subject matter.

FIG. 3 provides a section view of the shroud assembly segment taken along the line 3-3 of FIG. 2.

FIG. 4 provides a cross-section view of a portion of a turbine section of a gas turbine engine having the exemplary shroud assembly.

FIG. 5 provides a schematic section view of the exemplary shroud assembly.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within or defining the hot gas path 78, may comprise a composite material, such as a ceramic matrix composite (CMC) material having high temperature capability. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a composite material may be used within the hot gas path 78, such as within the combustion and/or turbine sections of engine 10. As an example, one or more stages of turbine rotor blades and/or turbine nozzles may be CMC components formed from CMC materials. As another example, one or more components lining the hot gas path 78, such as shrouds positioned radially outward from the turbine blades, may be CMC components formed from CMC materials. However, composite components made from CMC or other composite materials may be used in other sections as well, e.g., the compressor and/or fan sections.

Turning to FIGS. 2-5, a shroud assembly 100 will be described according to an exemplary embodiment of the present subject matter. FIG. 2 provides a front view or a forward looking aft view of a segment of the shroud assembly 100, and FIG. 3 provides a section view of the shroud assembly segment taken along the line 3-3 of FIG. 2. FIG. 4 provides a cross-section view of a portion of a turbine section of a gas turbine engine, such as the HP turbine 28 or LP turbine 30 of the turbofan engine 10, through the shroud assembly 100. FIG. 5 provides a schematic forward looking aft section view of the shroud assembly 100.

As shown in FIGS. 2-5, the shroud assembly 100 includes an annular shroud 102 and a shroud hanger 104. The shroud 102 extends circumferentially about the axial centerline 12 of the turbofan engine 10 such that the shroud 102 surrounds the turbine rotor blades 70 of the HP turbine 28. The shroud 102 includes a hot or flow path side 106 that faces the blades 70 and hot gas flow path 78, and a cold side 108 opposite the hot side 106. The cold side 108 faces a cavity 132 that defines a flow path for a cooling fluid, as described in greater detail below. The shroud hanger 104 is configured to couple the shroud 102 with a casing of the engine 10. The shroud hanger 104 may directly mount the shroud 102 to the outer casing 18 of the core turbine engine 16 (see FIGS. 1 and 4) or may indirectly couple the shroud 102 with the outer casing 18 via a hanger support (not shown). Although described herein with respect to the HP turbine 28, the shroud assembly 100 also could be used with the LP turbine 30 or in any other suitable portion of the engine 10.

The shroud 102 is often circumferentially segmented into a plurality of shroud segments 112, i.e., the shroud segments 112 together form the annular shroud 102. Similarly, the shroud hanger 104 may be circumferentially segmented into a plurality of hanger segments 114, i.e., the hanger segments 114 together form the annular shroud hanger 104. It will be appreciated, however, that the shroud assembly 100 need not comprise the same number of shroud segments 112 as hanger segments 114.

A plurality of seals (not shown) may extend between adjacent shroud segments 112, e.g., to seal against the ingestion of hot gas into the cooling fluid flow path and to prevent unwanted leakage of cooling flow into the hot gas flow path 78. Each shroud segment 112 comprises a hot side portion 116 and a cold side portion 118. The hot side portion 116 is a portion of the hot side 106 of the shroud 102, and the cold side portion 118 is a portion of the cold side 108 of shroud 102. A hanger segment 114 mounts one or more of the shroud segments 112 in the gas turbine engine 10, e.g., using one or more pins 134 or similar mounting hardware as illustrated in FIG. 4. In some embodiments, one hanger segment 114 may mount one shroud segment 112 in the engine 10, such that the ratio of hanger segments 114 to shroud segments 112 is 1:1, or one hanger segment 114 may mount two shroud segments 112 in the engine 10, such that the ratio of hanger segments 114 to shroud segments 112 is 1:2. Of course, other ratios of hanger segments 114 to shroud segments 112 may also be used, and the appropriate number of shroud segments 112 per hanger segment 114 may depend, e.g., on the overall size and/or configuration of the engine 10. In other embodiments, each of the shroud 102 and shroud hanger 104 may be a single piece annular structure, rather than formed from a plurality of shroud segments 112 and hanger segments 114, respectively.

The shroud hanger 104 includes a plurality of conduits 120 for directing a cooling fluid F across the cold side 108 of the shroud 102; it will be appreciated that the shroud hanger 104 may include any number of conduits 120. The conduits 120 may be cast in, machined in, attached or coupled to, or otherwise defined or included in the shroud hanger segments 114, which may be formed from a metal, metal alloy, CMC material, or other suitable material. That is, the conduits 120 may be formed in or with each hanger segment 114 such that the conduits 120 are integral with the shroud hanger 104, or the conduits 120 may be separate pieces that are attached or coupled to each hanger segment 114. Referring FIGS. 2 and 3, the depicted exemplary shroud hanger segment 114 includes two conduits 120, a first conduit 120a and a second conduit 120b, adjacent a shroud segment 112. In other embodiments, the hanger segment 114 may include only one conduit 120 or more than two conduits 120. Each conduit 120 is configured for receipt of a flow of the cooling fluid F. Further, each conduit 120 defines an outlet 122 configured for the flow of cooling fluid F to exit the conduit 120 about or substantially tangential to the shroud cold side 108. More particularly, the first conduit 120a defines a first outlet 122a, and the second conduit 120b defines a second outlet 122b. Each outlet 122a, 122b is configured for the flow of cooling fluid F to exit the respective conduit 120a, 120b nearly or substantially tangential to the cold side portion 118 of the shroud segment 112 adjacent the conduits 120a, 120b. As such, the cooling fluid F exits the conduits 120 near tangential to a circumferential direction C defined by the gas turbine engine 10. For example, the cooling fluid F may exit the conduits 120 at an angle α from 0° to about 30° with respect to the circumferential direction C. In particular embodiments, the angle α may be within a range of about 5° to about 15° with respect to the circumferential direction C.

Moreover, in the illustrated embodiment, each conduit 120 comprises a first arm 124 that defines a first channel 126 for receipt of the flow of cooling fluid F and a second arm 128 that extends from the first arm 124. The second arm 128 defines a second channel 130 for receipt of the flow of cooling fluid F from the first channel 126. Further, the second arm 128 defines the outlet 122 for the cooling fluid F to exit the conduit 120. As shown in FIG. 3, each first arm 124 extends along the axial direction A defined by the engine 10, and each second arm 128 extends along the circumferential direction C. As such, the depicted conduits 120 have perpendicular arms 124, 128, i.e., the second arm 128 extends 90° with respect to the first arm 124. However, in other embodiments, the second arm 128 may extend at other angles with respect to the first arm 124, e.g., an angle less than or greater than 90°.

As illustrated most clearly in FIG. 4, the plurality of shroud segments 112, which form the shroud 102, and the shroud hanger 104 together define an annular cavity 132. As previously described, the cavity 132 forms the cooling fluid flow path faced by the shroud cold side 108, such that the cold side portion 118 of each shroud segment 112 faces the cavity 132. Referring to FIG. 5, a schematic cross-section view is provided of the shroud assembly 100, where the divisions between shroud segments 112 are shown with dashed or broken lines. It will be appreciated that the flow path defined by the cavity 132 extends substantially uninterrupted about the axial centerline 12 of the gas turbine engine 10. That is, virtually no obstacles, or minimal obstacles, impede the flow of cooling fluid F about the annular cavity 132. As such, the tangential or shearing flow of the cooling fluid F from the outlets 122 into the cavity 132 induces a swirling flow around the cavity 132, which may increase the cooling efficiency of the fluid F in cooling the shroud 102. More particularly, the hot side 106 of the shroud 102 is exposed to the combustion gases 66 flowing in the hot gas path 78, and thus, the shroud 102 experiences the relatively high temperatures of the combustion gases 66. Cooling the cold side 108 of the shroud 102 with the cooling fluid F can help protect the shroud 102 from the effects of the combustion gas temperatures, thereby prolonging the life of the shroud 102 and/or segments 112 of the shroud 102. A swirling flow may be described as a flow of fluid that turns around and keeps coming back toward a reference point, line, or plane, e.g., a swirling flow of air may comprise air molecules that keep turning around and coming back toward the reference. As described herein, the tangential flow of cooling fluid F creates a circumferential flow about the cavity 132 or a ring of swirling flow on the cold side 108 of the shroud 102, i.e., on the cold side portion 118 of each shroud segment 112.

Further, providing the cooling fluid F to a cavity 132 as described herein can increase the cooling efficiency of the cooling fluid F. For instance, the tangential and swirling flow of cooling fluid F along the shroud cold side 108 is relatively uniform, such that the cooling distribution and the heat transfer coefficient (HTC) is relatively uniform. In particular, the HTC of the shroud assembly 100 is more uniform than known cooling designs using impingement baffles, which provide cooling fluid through discrete impingement holes. Moreover, the shroud assembly 100 shown in FIGS. 2-5 allows pressure and flow communication between shroud segments 112. That is, the pressure and flow are distributed throughout the cavity 132, which is open from one shroud segment 112 to an adjacent shroud segment 112. The open annular cavity 132 reduces the effects of occlusion of an outlet 122, which feeds the cooling fluid F to the cavity 132, as it allows the average flow to be essentially the same even if an outlet 122 is occluded. The open annular cavity 132 also improves cooling uniformity of the shroud segments 112.

Further, as depicted in FIG. 4, each shroud segment 112 is mounted to the shroud hanger 104 such that the shroud segment 112 is radially inward of the shroud hanger 104. Thus, the plurality of shroud segments 112 form an inner boundary of the cavity 132 and the shroud hanger 104 forms an outer boundary of the cavity 132. It will be appreciated that the shroud hanger 104 extends about the axial centerline 12 of the engine 10 to mount the shroud 102 in the engine 10. The shroud hanger 104 may be a single piece structure or segmented into two or more hanger segments. In some embodiments, the shroud 102 and shroud hanger 104 may be a single integral annular structure, or in other embodiments, the shroud 102 and shroud hanger 104 may be formed from a plurality of integral shroud and hanger segments, i.e., the integral shroud 102 and shroud hanger 104 may be circumferentially segmented into a plurality of segments that together form an annular shroud 102 and hanger 104.

Additionally, the size, angle or orientation, shape, and/or number of conduits 120 and/or outlets 122 can be varied between embodiments of the shroud assembly 100 to tailor the cooling fluid flow to the desired cooling effectiveness or a needed cooling distribution. For instance, the cross-sectional area of the conduits 120 and/or outlets 122 may be changed to vary the cooling distribution or effectiveness, for example by increasing the velocity of the flow in the cavity 132 with a smaller, nozzle shaped outlet 122 or by reducing the velocity with a larger, diffuser shaped outlet 122. Further, the orientation of the conduits 120 with respect to the shroud assembly 100 may be varied to achieve a certain cooling distribution or effectiveness. More particularly, the conduits 120 need not comprise a first arm 124 and second arm 128 as shown in the depicted embodiment. For example, the conduits 120 may extend at an angle with respect to the axial direction A (without a second arm that extends along another direction), the conduits 120 may extend along the radial direction R (without a second arm that extends along another direction), or the conduits 120 may comprise arms or sections in addition to the first and second arms 124, 128. Thus, the configuration of the conduits 120 may be varied to manipulate the cooling distribution or effectiveness, as long as the cooling fluid F exits the conduits 120 nearly tangential to the shroud 102. In addition, the number or count of the conduits 120 and/or outlets 122 may vary among embodiments of the shroud assembly 100 to provide a different cooling distribution or effectiveness between the embodiments. Further, changes in the shape of the conduits 120, e.g., changes in the cross-sectional shape of the outlets 122, can be made to tailor or control the amount of fluid flow F provided to the hanger cavity 132 and the pressure drop from the cavity that feeds the hanger cavity 132 to the hanger cavity 132, as well as the velocity, angle, and diffusion of the fluid flow F and how the flow F impinges on the shroud 102 and hanger 104 (e.g., the walls of the hanger 104). For instance, one or more outlets 122 may have a nozzle shape to increase the velocity of the fluid flow F as the flow F exits the conduit 120. As another example, one or more outlets 122 may have a diffuser shape to diffuse or reduce the velocity of the fluid flow F, e.g., to control the impingement of the fluid F on the shroud 102. Additionally, the shape of the conduit cross-section could be circular, elliptical, slotted (e.g., one direction multiple times the other), etc. to achieve different distributions of flow velocities in the cavity 132.

As described herein, the shroud 102 may be formed from a CMC material; thus, where the shroud 102 is made from a plurality of shroud segments 112, each shroud segment 112 may be formed from a CMC material. To form the shroud 102 or shroud segments 112 from a CMC material, a plurality of CMC plies may be laid up to form a layup or preform as previously described. Then, the layup is debulked and, if appropriate, cured while subjected to elevated pressures and temperatures to produce a cured preform, e.g., the layup or preform may be cured in an autoclave to form an autoclaved body. In exemplary embodiments, the autoclaved body is then heated (fired) in a vacuum or inert atmosphere to decompose the binders, remove the solvents, and convert the precursor to the desired ceramic matrix material. Due to decomposition of the binders, the result for the preform is a porous CMC fired body that may undergo densification, e.g., melt infiltration (MI), to fill the porosity and yield the respective CMC component.

Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by a tool during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Optionally, after processing, the CMC component (i.e., CMC shroud 102 or shroud segments 112) may be finish machined, if and as needed, and coated with one or more coatings, such as an environmental barrier coating (EBC). Moreover, the method described above is provided by way of example only. As an example, other known methods or techniques for curing composite plies, as well as for densifying a CMC component, may be utilized. Alternatively, any combinations of these or other known processes may be used. Further, although described herein with respect to CMC shroud 102 or CMC shroud segments 112, the present subject matter could be applied to a shroud 102 or shroud segments 112 formed from any suitable material or combination of materials, such as a metal or metal alloy, using any suitable process, e.g., casting, additive manufacturing, etc.

A CMC shroud 102 or CMC shroud segments 112 may be particularly suitable for the shroud assembly 100. For instance, a CMC shroud 102 or CMC shroud segments 112 need not have ribs along the cold side 108 or cold side portion 118; ribs are typically provided along the cold side of metallic shrouds. As such, the CMC shroud 102 is relatively flat or unobstructed along its cold side 108, which helps the tangential cooling fluid flow build up or increase its velocity. An increased cooling flow velocity has an increased cooling effectiveness. Further, the absence of ribs reduces the opportunity for dead areas in the flow, e.g., a dead area may exist behind a rib such that the dead area is eliminated with the elimination of the rib.

Accordingly, as described herein, shroud assemblies are provided having features for cooling a cold side of the shroud that, for example, provide substantially uniform flow along the shroud cold side. Uniform cooling flow enables uniform heat transfer coefficients and uniform cooling distribution across the shroud, which can be particularly beneficial for CMC shrouds. Further, the shroud assembly described herein, in which the cooling flow is provided through conduits in the shroud hanger to a cavity defined by the shroud cold side and the shroud hanger such that the flow is tangential to the shroud cold side, has a reduced weight compared to shroud assemblies having an impingement baffle to provide impingement cooling to the shroud cold side. Moreover, the shroud cooling can be tailored by changing the size, angle or orientation, and/or count of the conduit and/or conduit outlet. Still further, even accounting for manufacturing tolerances and/or occlusion of a cooling flow feed hole or conduit, the shroud assembly described herein more easily and efficiently maintains back flow margin, such that air may be pushed into the gas flow path rather than hot gas being ingested into the cavity, because the pressure is distributed throughout the whole annular cavity. In addition, the shroud assembly described herein allows robust cooling of the shroud, for example, because the coolant heat pickup is from an average hot gas temperature rather than a hot streak due to the flow and pressure communication throughout the shroud cavity. What is more, the cooling fluid may be fed to the shroud cavity at a relatively high tangential velocity, which can provide reduced dust accumulation on the shroud cold side compared to known shroud designs. As such, the shroud assembly described herein may be particularly beneficial for use in regions in which a large amount of dust is ingested into the gas turbine engine. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A shroud assembly for a gas turbine engine, the gas turbine engine defining an axial direction and a circumferential direction, the shroud assembly comprising:
   a shroud segment having a hot side portion and a cold side portion, the hot side portion facing a gas flow path of the gas turbine engine, the cold side portion facing a cooling fluid flow path; and
   a shroud hanger for mounting the shroud segment in the gas turbine engine, the shroud hanger defining a conduit for receipt of a flow of cooling fluid, the conduit comprising
      a first arm extending along the axial direction and defining a first channel for receipt of the flow of cooling fluid, and
      a second arm extending from the first arm along the circumferential direction, the second arm defining an outlet and a second channel for receipt of the flow of cooling fluid from the first channel,
   wherein the outlet is configured for the flow of cooling fluid to exit the conduit substantially tangential to the cold side portion of the shroud segment.

2. The shroud assembly of claim 1, wherein the conduit is a first conduit and the outlet is a first outlet, and wherein the shroud hanger includes a second conduit for receipt of a flow of cooling fluid, the second conduit defining a second outlet for the flow of cooling fluid to exit the second conduit substantially tangential to the cold side portion of the shroud segment.

3. The shroud assembly of claim 1, wherein the shroud segment is formed from a ceramic matrix composite material.

4. The shroud assembly of claim 3, wherein the gas turbine engine includes a plurality of shroud segments, wherein the shroud segments together forming an annular shroud extending circumferentially about an axial centerline of the gas turbine engine, and wherein the shroud and shroud hanger together define the cooling fluid flow path.

5. A shroud assembly for a gas turbine engine, the gas turbine engine defining an axial direction and a circumferential direction, the shroud assembly comprising:
   a plurality of shroud segments, each shroud segment having a hot side portion and a cold side portion, the hot side portion facing a gas flow path of the gas turbine engine; and
   a shroud hanger for mounting the shroud segments in the gas turbine engine, the shroud hanger defining a plurality of conduits for receipt of a flow of cooling fluid, each conduit comprising
      a first arm extending along the axial direction and defining a first channel for receipt of the flow of cooling fluid, and
      a second arm extending from the first arm along the circumferential direction, the second arm defining an outlet and a second channel for receipt of the flow of cooling fluid from the first channel,
   wherein the shroud segments and the shroud hanger together define an annular cavity, the cold side portion of each shroud segment facing the cavity,
   wherein each outlet of the plurality of outlets is configured for the flow of cooling fluid to exit each conduit into the cavity substantially tangential to the cold side of a shroud segment adjacent the outlet.

6. The shroud assembly of claim 5, wherein the cavity defines a cooling fluid flow path for the flow of cooling fluid, and wherein the cooling fluid flow path extends uninterrupted about an axial centerline of the gas turbine engine.

7. The shroud assembly of claim 5, wherein each shroud segment is mounted to the shroud hanger such that the shroud segment is radially inward of the shroud hanger, the shroud segments forming an inner boundary of the cavity and the shroud hanger forming an outer boundary of the cavity.

8. The shroud assembly of claim 5, wherein each shroud segment is formed from a ceramic matrix composite material.

9. The shroud assembly of claim 5, wherein each conduit of the plurality of conduits is defined such that the flow of cooling fluid exits each conduit at an angle within a range of 0° to 30° with respect to a circumferential direction defined by the gas turbine engine.

10. A method of cooling an annular shroud of a shroud assembly of a gas turbine engine, the shroud assembly comprising:
    a plurality of shroud segments positioned side-by-side along a circumferential direction to form the shroud, each shroud segment having a hot side portion and a cold side portion, the hot side portion facing a gas flow path of the gas turbine engine; and
    a shroud hanger for mounting the shroud segments in the gas turbine engine, the shroud segments and the shroud hanger together defining an annular cavity, the shroud hanger defining a plurality of conduits for receipt of a flow of cooling,
    the method comprising:
    directing the flow of cooling fluid into the cavity along the circumferential direction and substantially tangential to the cold side portion of each shroud segment of the plurality of shroud segments such that the cooling fluid swirls about the cavity to cool the cold side portion of each shroud segment.

11. The method of claim 10, wherein the cold side portion of each shroud segment defines a radially inner boundary of the cavity,
    wherein each conduit defines an outlet at the cavity, and wherein each outlet of the plurality of outlets is configured for directing the flow of cooling fluid into the cavity.

12. The method of claim 10, wherein each conduit is shaped as a nozzle to provide increased flow velocity in the cavity.

13. The method of claim 10, wherein each conduit is shaped as diffuser to provide reduced flow velocity in the cavity.

* * * * *